United States Patent
Huang et al.

(10) Patent No.: US 8,650,438 B2
(45) Date of Patent: Feb. 11, 2014

(54) CONTROLLER FOR READING DATA FROM NON-VOLATILE MEMORY

(75) Inventors: Cheng Kuo Huang, Cupertino, CA (US); Siu-Hung Fred Au, Fremont, CA (US); Lau Nguyen, Sunnyvale, CA (US); Perry Neos, Los Altos, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

(21) Appl. No.: 12/842,714

(22) Filed: Jul. 23, 2010

(65) Prior Publication Data

US 2011/0041007 A1  Feb. 17, 2011

Related U.S. Application Data

(60) Provisional application No. 61/256,502, filed on Oct. 30, 2009, provisional application No. 61/233,118, filed on Aug. 11, 2009.

(51) Int. Cl.
*G06F 11/00* (2006.01)
(52) U.S. Cl.
USPC .................... 714/6.24; 714/6.11; 714/54
(58) Field of Classification Search
None
See application file for complete search history.

(56) References Cited

U.S. PATENT DOCUMENTS

| | | | |
|---|---|---|---|
| 5,754,565 A * | 5/1998 | Mo et al. | 714/769 |
| 7,281,110 B1 | 10/2007 | Cismas | |
| 2006/0215481 A1* | 9/2006 | Dally et al. | 365/233.5 |
| 2008/0126682 A1* | 5/2008 | Zhao et al. | 711/103 |
| 2008/0244244 A1* | 10/2008 | Tuuk et al. | 712/226 |
| 2008/0270678 A1 | 10/2008 | Cornwell et al. | |
| 2009/0172333 A1 | 7/2009 | Marcu et al. | |
| 2010/0262721 A1* | 10/2010 | Asnaashari et al. | 710/5 |

OTHER PUBLICATIONS

International Search Report and Written Opinion for International Application No. PCT/US2010/043095, mailed Oct. 1, 2010.

* cited by examiner

*Primary Examiner* — Scott Baderman
*Assistant Examiner* — Jason Bryan

(57) ABSTRACT

The present disclosure includes systems and techniques relating to solid state drive controllers. In some implementations, a device includes a buffer that holds a block of data corresponding to a command from a host. The command identifies the block of data and a logical sequence in which the identified block of data is to be transmitted. In response to the command, a data retriever included in the device retrieves the portions of the block of data from non-volatile memory units in a retrieval sequence that is different from the logical sequence. When the device receives multiple commands identifying multiple blocks of data, the device services the commands in parallel by retrieving portions of blocks of data identified by both commands.

18 Claims, 5 Drawing Sheets

CONTROLLER FOR READING DATA FROM NON-VOLATILE MEMORY

CROSS-REFERENCE TO RELATED APPLICATIONS

This application claims the benefit of priority under 35 U.S.C. §119(e) to U.S. Patent Application No. 61/233,118, entitled "An Efficient Random Read Strategy and Implementation for Solid-State Devices," which was filed on Aug. 11, 2009, and to U.S. Application No. 61/256,502, entitled "A Method for Maximizing the Read Performance of A Set of Large Unbalanced Commands," which was filed on Oct. 30, 2009. The disclosures of the foregoing applications are incorporated herein by reference in their entirety.

BACKGROUND

The present disclosure describes systems and techniques relating to solid-state drives (SSDs).

SSDs are data storage devices that use solid state memory to store data. Non-volatile memory, for example, NAND based flash memory is often used as the storage devices with SSDs. An SSD, which is operatively coupled to a non-volatile memory device, includes a controller that is configured to write data to and retrieve data from the non-volatile memory devices. Often, multiple non-volatile memory devices are coupled to the SSD controller to increase data throughput through the SSD. A block of data is stored in sectors of the non-volatile memory units. The SSD controller can retrieve portions of the block of data via channels in the SSD controller by scanning the sectors of the non-volatile memory units that are operatively coupled to each channel. In some situations, all or portions of the block of data can be concentrated in sectors of non-volatile memory units operatively coupled to one channel.

SUMMARY

This specification describes technologies relating to a controller for reading data from non-volatile memory. An innovative aspect of the described systems and techniques can be implemented as a device that includes a buffer configured to hold a block of data corresponding to a command. The command identifies the block of data and a first sequence in which the identified block of data is to be transmitted. Portions of the block of data are stored in respective non-volatile memory units. The device includes a data retriever configured to retrieve the portions of the block of data from the respective non-volatile memory units in response to the command. The data retriever is configured to retrieve the portions in a second sequence that is different from the first sequence and to transmit the retrieved portions of the block of data to the buffer. The block of data retrieved in the second sequence is tracked. The buffer transmits the block of data in response to an indication that the data retriever has retrieved all of the portions included in the block of data.

This, and other aspects, can include one or more of the following features. The data retriever can be configured to interleave portions of a block of data corresponding to a first command with portions of a block of data corresponding to a second command. Each non-volatile memory unit can include multiple sectors. The portions of the block of data can be stored across the sectors of the non-volatile memory units. The data retriever can be configured to retrieve the portions of the block of data from the sectors in the second sequence. The device can further include a sequence that can be configured to receive the first sequence, track the block of data retrieved in the second sequence, and provide the indication that the data retriever has retrieved all of the portions included in the block of data. The device can further include an error checking and correction unit operatively coupled to the data retriever and configured to check one or more portions of a block of data retrieved by the data retriever, where the data retriever transmits the portions of the block of data to the error checking and correction units in the second sequence. The error checking and correction unit can be operatively coupled to the sequencer and configured to transmit a signal to the sequencer that indicates that a portion of the block of data is error-free. The sequencer can track the block of data retrieved in the second sequence by determining that, for each portion of the block of data, the error checking and correction unit transmits an identifier of the portion of the block of data and a signal indicating that the portion is error-free.

Another innovative aspect of the described systems and techniques can be implemented as a method that includes receiving a command for a block of data. The command identifies the block of data and a first sequence in which the identified block of data is to be transmitted. Portions of the block of data are stored in respective non-volatile memory units. The method includes retrieving, by processing circuitry, the portions of the block of data from the respective non-volatile memory units in a second sequence that is different from the first sequence. The retrieved block of data is stored in a buffer. The method includes determining that the retrieved data includes all the portions of the block of data in accordance with the second sequence and directing the buffer to transmit the block of data in response to the determining.

This, and other aspects, can include one or more of the following features. The portions of the block of data retrieved in the second sequence can be tracked. An additional command to transmit additional blocks of data can be received. The block of data corresponding to the command and the additional block of data corresponding to the additional command can be retrieved in parallel. Portions of the block of data can be interleaved with portions of the additional block of data. The interleaved portions can be stored in the buffer. The retrieved portions of the block of data can be transmitted to the buffer. Each non-volatile memory unit can include multiple sectors. The portions of the block of data can be stored across the sectors of the non-volatile memory units. Retrieving the portions of the block of data can include retrieving the portions of the block of data from the sectors in the second sequence. One or more portions of a block of data can be checked to determine that the retrieved block of data is error-free. A signal that indicates that a portion of the block of data is error-free can be transmitted. The tracking can include tracking the block of data retrieved in the second sequence by determining that, for each portion of the block of data, an identifier of the portion of the block and a signal indicating that the portion is error free can be transmitted.

The described systems and techniques can be implemented in electronic circuitry, computer hardware, firmware, software, or in combinations of them, such as the structural means disclosed in this specification and structural equivalents thereof. This can include at least one computer-readable medium embodying a program operable to cause one or more data processing apparatus (for example, a signal processing device including a programmable processor) to perform operations described. Thus, program implementations can be realized from a disclosed method, system, or apparatus, and apparatus implementations can be realized from a disclosed system, computer-readable medium, or method. Similarly, method implementations can be realized from a disclosed system, computer-readable medium, or apparatus, and system implementations can be realized from a disclosed method, computer-readable medium, or apparatus.

For example, the disclosed embodiment(s) below can be implemented in various systems and apparatus, including, but not limited to, a special purpose data processing apparatus (for example, a wireless access point, a remote environment monitor, a router, a switch, a computer system component, a medium access unit), a mobile data processing apparatus (for example, a wireless client, a mobile telephone, a personal digital assistant (PDA), a mobile computer, a digital camera), a general purpose data processing apparatus (for example, a minicomputer, a server, a mainframe, a supercomputer), or combinations of these.

Thus, according to another aspect of the described systems and techniques, a system can include multiple non-volatile memory units configured to store portions of blocks of data, a host configured to transmit commands to receive one or more blocks of data stored in one or more of the non-volatile memory units, and a controller configured to transmit data between the non-volatile memory units and the host. The controller can be configured to receive commands from the host, each command identifying a block of data and a first sequence in which the block of data is to be transmitted to the host, retrieve, in parallel, blocks of data that are stored in the non-volatile memory units, where portions of one or more blocks of data are retrieved in a second sequence that is different from the first sequence identified by the corresponding command, determine that, for each command, the retrieved portions of a block of data include all of the data in the block, and transmit the retrieved block of data in response to the determining.

Particular embodiments of the subject matter described in this specification can be implemented so as to realize one or more of the following advantages. The techniques described here can reduce wastage of bandwidth in channels through which a controller retrieves blocks of data. Further, the techniques can increase an efficiency with which blocks of data are retrieved from non-volatile memory units. In addition, commands requesting multiple blocks of data can be serviced in parallel. Specifically, for example, when large blocks of data are distributed evenly in fewer than all channels or concentrated in one channel, then multiple commands can be executed in addition to the command for the large block of data in parallel. By doing so, in the same time it takes to service a single large command in multiple passes, additional commands can also be serviced. This can result in minimizing the execution time for a given group of large commands. Furthermore, throughput of the SSD controller can be boosted.

Details of one or more implementations are set forth in the accompanying drawings and the description below. Other features, objects and advantages may be apparent from the description and drawings, and from the claims.

DETAILED DESCRIPTION

Figure 1:
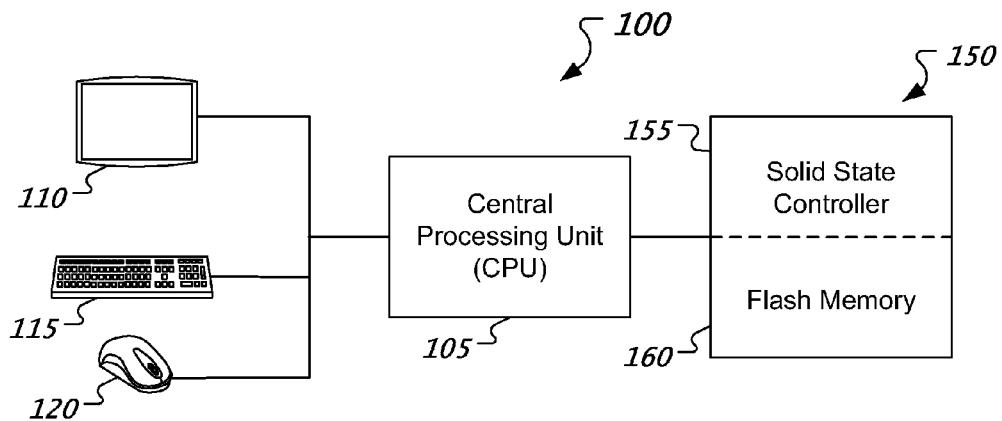
FIG. 1 shows an example of a computing system including a solid state memory subsystem.

FIG. 1 shows an example of a computing system 100 including a solid state memory subsystem 150. The system 100 includes a central processing unit (CPU) 105, a display device 110 (for example, a CRT (cathode ray tube) or LCD (liquid crystal display) monitor), and an input device such as a keyboard 115, and a pointing device 120 (which although shown as a mouse device in FIG. 1, can be other pointing devices). The system 100 can include one or more additional processors and one or more additional input/output devices, for example, microphone, speakers, printer, etc.

The solid state memory subsystem 150 includes a solid state controller 155 and a flash memory 160, for example, NAND flash memory. The flash memory 160 can include one or more single-level cell (SLC) devices and/or multi-level cell (MLC) devices. The solid state memory subsystem 150 can include control logic, which can be designed to allow the solid state memory subsystem 150 to load operating system and applications software into the system 100.

The solid state memory subsystem 150 is configured to operate in a multi-channel configuration with the solid state controller 155. In such a configuration, the controller 155, in response to receiving commands from a host, for example, the CPU 105 transmits data between the CPU 105 and the flash memory 160 through multiple channels in parallel to provide high data throughput. For example, the flash memory 160 can include four channels operatively coupled to multiple NAND flash memory units (described with reference to FIGS. 2 and 3), each of which can transfer data at a rate of about 1.6 Gbps. In such an arrangement, the throughput that the solid state controller 155 can achieve is four times greater than the throughput that the controller 155 can achieve if the flash memory 160 transmitted data in serial from the four NAND flash memory units. Using the techniques described here, an efficiency with which the solid state controller 155 retrieves data from multiple NAND flash memory units to which the controller 155 is coupled, can be increased.

As will be appreciated, the system 100 represents a desktop personal computer, which can include many other devices and subsystems that are not shown, such as a hard disk drive, a network interface, a motherboard, etc. However, this is only one example of a larger system in which the presently disclosed subject matter can be implemented. Other examples of such larger devices and systems include laptops, notebooks, diskless sub-notebooks, and ultra-slim drives that fit into a PCI ExpressCard, PCIeMini slot on a laptop or PCIe slot on a desktop, while appearing as just another drive. Examples also include smart phones, netbooks, media players, and the like, that employ non-volatile memory devices.

However, irrespective of these specific examples, it will be appreciated that the subject matter described herein can be made compatible with many different types of computing systems. In addition, the flash memory 160 can include many different types of solid state storage devices that are able to maintain their data without any external source of power. Such devices can include flash memory devices, such as a BIOS chip, CompactFlash, SmartMedia, a memory stick, PCMCIA Type I and Type II memory cards, and memory cards for video game consoles. Such devices can also include phase change memory devices.

Figure 2:
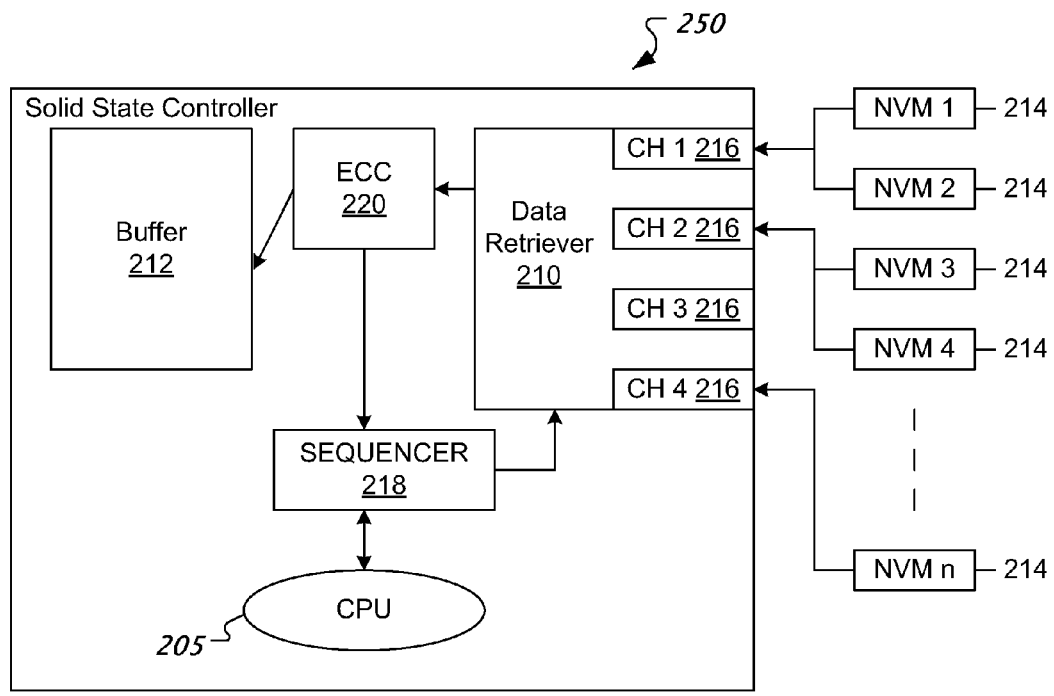
FIG. 2 shows an example of a solid state controller.

FIG. 2 shows an example of a solid state controller 250. The controller 250 is configured to operatively couple to a host, for example, the CPU 105 of a computer system. The controller receives commands for blocks of data from the host and transmits the blocks of data identified by the command to the host. For example, the CPU 105 transmits a command that identifies a block of data to the controller 250, and the controller 250, in response, retrieves the block of data from multiple non-volatile memory units using techniques described here.

The controller 250 includes a data retriever 210, for example, NFLASH, which is configured to retrieve blocks of data. The data is stored in multiple non-volatile memory units (NVMs) 214, for example, NVM 1, NVM 2, NVM 3, NVM 4, ... NVM n. For example, each block of data is divided into multiple portions and each portion is stored in a sector of a corresponding NVM. All portions of a single block of data need not be stored in the same NVM. Rather, the portions can be distributed across multiple NVMs.

The data retriever 210 includes multiple channels 216 that are operatively coupled to the NVMs 214. For example, as shown in FIG. 2, the data retriever 210 includes four channels 216. It will be appreciated that the data retriever 210 can have more channels, for example, five or six, or fewer channels, for example, two or three. A channel 216 can be operatively coupled to one or more NVMs 214. For example, channel 1 (216) is coupled to NVMs 1 and 2 (214), channel 2 (216) is coupled to NVMs 3 and 4 (214). Channel 3 (216) is coupled to one or more NVMs 214 (not shown) and channel 4 (216) is coupled to NVM n (214). Each NVM 214 can include multiple sectors in which a portion of a block of data can be physically stored. The data retriever 210 is configured to retrieve a portion of a block of data from the sector in an NVM 214 in which the portion is stored.

The controller 250 further includes a buffer 212 configured to store retrieved portions of blocks of data. For example, the data retriever 210 retrieves portions of a block of data from the NVMs through the channels 216, and transmits the retrieved portions to the buffer 212. The buffer 212 serves as a temporary storage unit of the portions.

The controller 250 additionally includes a sequencer 218 that is configured to track portions of the block of data retrieved from the NVMs 214. In particular, the sequencer 218 is configured to track portions retrieved by the data retriever 210 and transmitted to the buffer 212. The sequencer 218 does so until all portions of the block of data have been retrieved from the NVMs 214. Subsequently, the sequencer 218 transmits an indication, for example, a signal, to the buffer 212 indicating that all portions of a block have been retrieved. In response to receiving the indication from the sequencer 218, the buffer 212 transmits the retrieved portions of the block of data to the host.

In some implementations, the controller 250 includes an error checking and correction unit 220 that is operatively coupled to the data retriever 210. The error checking and correction unit 220 checks each portion of a block of data retrieved by the data retriever 210 to determine that the retrieved portion is error-free. The error checking and correction unit 220 is also coupled to the sequencer 218 to transmit a signal indicating that a retrieved portion is error-free.

Each portion of a block of data can be assigned a logical block address (LBA), which defines how data is stored in order of usage by the host. In some implementations, consecutive portions can be stored in consecutive NVMs. Alternatively, consecutive portions can be stored in the same NVMs. In another alternative, the portions can be distributed across the NVMs. Further, each NVM includes multiple sectors and each sector is configured to physically store a portion of a block of data. Thus, the portions of a block of data can be distributed across multiple sectors included in the multiple NVMs.

A method to retrieve the two blocks of data stored across multiple NVMs, in parallel, will be described with reference to Table 2 below. Retrieving two blocks of data in parallel means that portions of the blocks of data are retrieved in each pass over the sectors of the NVMs. In other words, the data retriever 210 does not wait to retrieve all portions of a first block before retrieving portions of a second block. Instead, the data retriever 210 retrieves portions of both blocks of data from the sectors in the NVMs. In Table 2 below, the portions of the block of data are represented according to the following convention: "Block No. _Portion No." The block number corresponds to a command and portion number corresponds to an identifier for a portion of a block of data. In some implementations, the portion number can be represented by a descriptor described below.

TABLE 2

Retrieving two blocks of data

| CHANNEL 0 (216) | CHANNEL 1 (216) | CHANNEL 2 (216) | CHANNEL 3 (216) |
|---|---|---|---|
| 1_0 | 2_1 | 1_2 | 1_3 |
| 1_1 | 2_5 | 2_2 | 2_3 |
| 1_4 |  | 2_6 |  |
| 2_0 |  |  |  |
| 2_4 |  |  |  |

In the example described with reference to Table 2, block 1 consists of five portions (1_0 to 1_4) and block 2 consists of seven portions (2_0 to 2_6). One method to retrieve block 1 and block 2 is to first retrieve all block_portions in block 1 and then retrieve all block_portions in block 2. Thus, the sequence of block_portion retrieval will be: 1_0 from channel 0; (skip channels 1, 2, and 3); 1_1; (skip channel 1); 1_2; 1_3; 1_4; (skip channels 1, 2, 3); 2_0; 2_1; 2_2; 2_3; 2_4; 2_5; and 2_6. Because retrieving all block_portions of block 1 prior to retrieving any block_portion of block 2 involves skipping channels, the bandwidth of the channels remains unused and delays are introduced during retrieval.

Alternatively, to maximize bandwidth usage and decrease delays, the data retriever 210 retrieves block_portion 1_0 from the first sector via channel 0, then retrieves block_portion 2_1 from the first sector via channel 1, then retrieves block_portion 1_2 from the first sector via channel 2, and then retrieves block_portion 1_3 from the first sector via channel 3. The data retriever 210 repeats these steps for the second sectors, the third sectors, and so on, until all blocks of data have been retrieved via all four channels. In other words, the data retriever 210 does not skip channels, but instead retrieves any block_portion that is found in a sector of a channel. No portion is retrieved from sectors in which no portion is stored.

This pattern of retrieval is determined based on descriptors that identify the portions of each block of data (described with reference to Table 3 below). The controller 250 identifies the portions of blocks of data that need to be retrieved based on the descriptors which are received from the host. For example, because the host has provided, in a command, a descriptor identifying block_portions 1_0 and 2_1, the data retriever 210 determines that the host has requested these block_portions and retrieves them. The data retriever 210 need not skip over block_portion 2_1 or other block_portions to retrieve the portion that succeeds block_portion 1_0, i.e., block_portion 1_1. Instead, the data retriever 210 can retrieve all block_portions specified by the host as the data retriever 210 identifies such block_portions.

Figure 3:
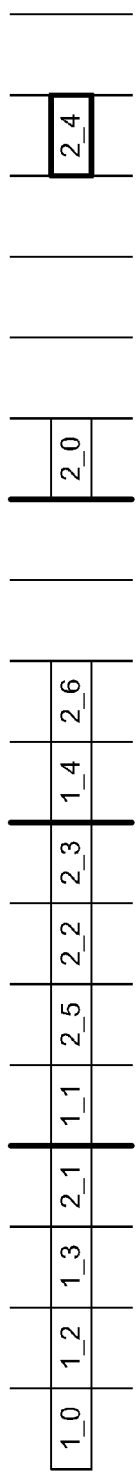
FIG. 3 shows an example of a dataflow during retrieval of two blocks of data.

FIG. 3 shows an example of a dataflow during retrieval of two blocks of data. In the example of FIG. 3, the dataflow during retrieval of two blocks of data is in the following sequence: 1_0, 1_2, 1_3, 2_1, 1_1, 2_5, 2_2, 2_3, 1_4, 2_6, 2_0, and 2_4. The dataflow shown in FIG. 3 is one of many possible sequences in which the portions of data can be retrieved from the NVMs 214 via the channels 0-3 (216). An alternative dataflow can, for example, be in the following sequence: 2_0, 2_1, 2_2, 2_3, 2_4, 2_5, 2_6, 1_3, 1_0, 1_2, 1_1, and 1_4. Notably, because the data retriever 210 need not retrieve successive portions of a block of data to the exclusion of other portions of a block of data, the dataflow includes non-successive portions of the same block_portion of data, for example, 1_0 followed by 1_2. Further, because the data retriever 210 need not retrieve all portions of a first block of data before retrieving portions of a second block of data, the data flow includes portions of block 1 interleaved with portions of block 2, for example, 1_3 followed by 2_1 followed by 1_1.

The data retriever 210 can retrieve the portions of blocks of data in the sequence in which the portions are stored in the sectors of the NVMs 214. To this extent, the sequence in which the portions of a block of data are retrieved is different from the sequence of successive portions of a block of data. Further, the data retriever 210 can interleave portions of block 1 with portions of block 2, thereby retrieving both blocks of data in parallel via the channels 216. A comparison of the dataflow shown with respect to FIG. 3 and a dataflow in which successive portions of a block are retrieved is shown below:

| Dataflow (FIG. 3) | Dataflow (Retrieval of successive portions) |
|---|---|
| 1_0 | 1_0 |
| 1_2 | 1_1 |
| 1_3 | 1_2 |
| 2_1 | 1_3 |
| 1_1 | 1_4 |
| 2_5 | 2_0 |
| 2_2 | 2_1 |
| 2_3 | 2_2 |
| 1_4 | 2_3 |
| 2_6 | 2_4 |
| 2_0 | 2_5 |
| 2_4 | 2_6 |

As described previously, the data retriever 210 retrieves the blocks of data from the NVMs 214 in response to receiving commands from a host, for example, the CPU 105. In addition to requesting the blocks of data, the CPU 105 specifies a sequence in which the block of data is to be transmitted to the CPU 105. For example, the CPU 105 specifies that block 1 (described with reference to Table 2) is to be transmitted in the sequence of successive portions, i.e., 1_0, 1_1, 1_2, 1_3, and 1_4. By retrieving the blocks of data in a sequence in which the portions are stored in the sectors of the NVMs, the data retriever 210 can retrieve the portions of the blocks of data in a sequence that is different from the sequence in which the portions are to be transmitted to the CPU 105. The controller 250 transmits the portions retrieved by the data retriever 210 in a manner described with reference to FIG. 4.

Figure 4:
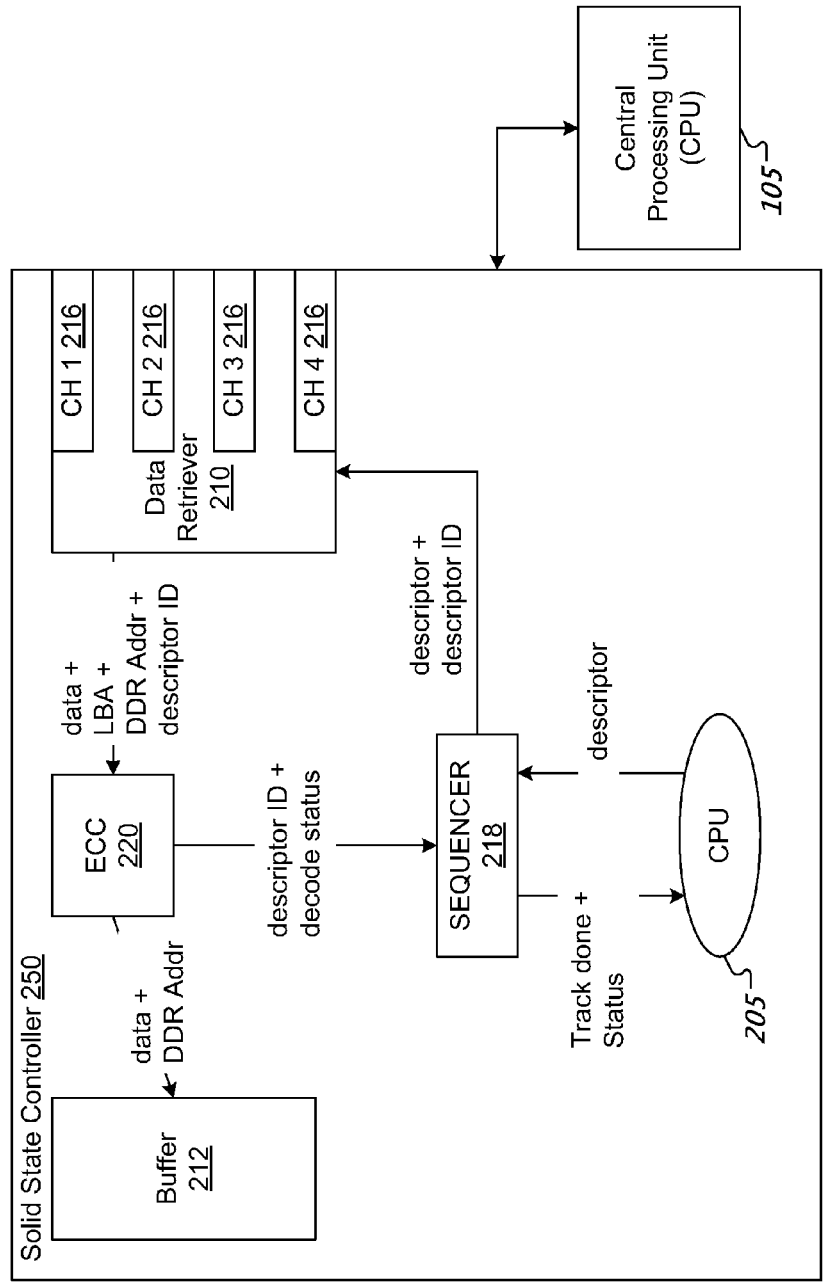
FIG. 4 shows an example of a data transmission strategy executed by the solid state controller.

FIG. 4 shows an example of a data transmission strategy executed by the solid state controller 250. The sequencer 218 receives a command for a block of data from the host, for example, CPU 105. In some implementations, the command includes multiple descriptors that identify the block of data, specifically, portions of the blocks of data. The CPU 205 transmits the descriptors identifying the portions of the blocks of data to the sequencer 218 in a logical order which represents the order in which the portions are to be transmitted by the controller 250 to the CPU 205. The controller 250 shown in FIG. 4 is operatively coupled to a CPU 205. It will be appreciated that the CPU 205 can be operatively coupled to several hosts, each of which can transmit commands to receive blocks of data. A descriptor is pictorially represented below:

| Logical Block Address (LBA) | Buffer Address | Physical Block Address (PBA) - (CH, CE, MP, NVM Address, etc.) |
|---|---|---|

The sequencer 218 stores the descriptors until the corresponding portions of a block of data (also known as allocation units (AU)) are retrieved by the data retriever 210 and transmitted to the buffer 212. In some implementations, the data retriever 210 transmits a retrieved portion of a block of data to the error checking and correction unit 220. In such implementations, the sequencer 218 can store the descriptors until the portions are processed by the error checking and correction unit 220 and sent to the buffer 212.

The sequencer 218 can add a descriptor ID to each descriptor to generate a new descriptor, which is represented pictorially below. The data retriever 210 stores the new descriptors until the corresponding portions have been retrieved from the NVMs 214 and transmitted to the buffer 212 or to the error checking and correction unit 220.

| LBA | Buffer Address | PBA - (CH, CE, MP, NVM Address, etc.) | ID |
|---|---|---|---|

The data retriever 210 transmits the portions retrieved from the NVMs in the sequence described previously (retrieval sequence) to the buffer 212 or to the error checking and correction unit 220. The retrieval sequence can be different from the logical sequence. With each retrieved portion, the data retriever 210 transmits the corresponding descriptor to the error checking and correction unit 220. For example, the content of the descriptor transmitted from the data retriever 210 to the error checking and correction unit 220 is represented pictorially below.

| LBA | Buffer Address | ID |
|---|---|---|

The error checking and correction unit 220 can process the portions one-by-one as the unit 220 receives the portions from the data retriever 210. The error checking and correction unit 220 can use the "Buffer Address" field in the descriptor to send each portion to the correct location in the buffer 212. The error checking and correction unit 220 can further use the "ID" field in the descriptor to transmit a signal to the sequencer 218 indicating that error checking for the corresponding portion has been completed.

The sequencer 218 collects the identifiers in the "ID" field that are transmitted by the error checking and correction unit 220. In some implementations, the sequencer 218 can be configured to store a long list of descriptor identifiers. In this manner, the sequencer tracks the portions of the block of data that the data retriever 210 has retrieved in the retrieval sequence. When the sequencer 218 determines that the error checking and correction unit 220 has transmitted all portions of the block of data that were specified in the logical sequence received from the CPU 205 to the buffer 212, the sequencer 218 transmits an indication to the buffer 212 to transmit the block of data to the CPU 205. In this manner, the controller 250 executes a data transmission strategy. Specifically, the controller 250 can be configured to receive a command from a host that specifies a logical sequence of portions of a block of data, retrieve the block of data in a retrieval sequence that can be different from the logical sequence, and transmit the block of data in the logical sequence to the host.

Examples of descriptors that are generated by the host, for example, the CPU 205 and transmitted to the sequencer 218 in the logical order are shown in Table 3 (below).

TABLE 3

Descriptors generated for two blocks of data

| Host Command No. | Descriptor No. | LBA | Buffer Address | CH# (part of PBA) |
|---|---|---|---|---|
| 1 | 0 | 110 | 0x1000_0000 | 0 |
|  | 1 | 111 | 0x1000_1000 | 0 |
|  | 2 | 112 | 0x1000_2000 | 2 |
|  | 3 | 113 | 0x1000_3000 | 3 |
|  | 4 | 114 | 0x1000_4000 | 0 |
| 2 | 0 | 210 | 0x2000_0000 | 0 |
|  | 1 | 211 | 0x2000_1000 | 1 |
|  | 2 | 212 | 0x2000_2000 | 2 |
|  | 3 | 213 | 0x2000_3000 | 3 |
|  | 4 | 214 | 0x2000_4000 | 0 |
|  | 5 | 215 | 0x2000_5000 | 1 |
|  | 6 | 216 | 0x2000_6000 | 2 |

Table 2 shows the channels 216 that each portion of a block of data in either block 1 or block 2 occupies. As described above, the portions of block 1 and block 2 are retrieved, in parallel, in a retrieval order that can be different from a logical order in which block 1 and block 2 are to be transmitted to the host. Further, the retrieved portions are transmitted to the buffer 212 in a sequence that is different from the logical sequence. For example, the retrieved portions can be transmitted to the buffer 212 in the sequence in which the portions were retrieved.

In some situations, the controller 250 receives two host commands—command 1 and command 2—requesting block 1 and block 2, respectively. Each of command 1 and command 2 also specifies a corresponding logical sequence for block 1 and block 2, respectively. The buffer 212 can receive all portions of block 2 before all portions of block 1. In such scenarios, the controller 250 can be configured to transmit retrieved blocks to the host in the order in which the host commands were received. In other words, if host command 1 was received before host command 2, then the controller 250 can first transmit portions of block 1 and then transmit portions of block 2. To this end, the controller 250 can delay a transmission of a block of data even if all portions of the data have been retrieved and stored in the buffer 212.

Alternatively, the controller 250 can be configured to alter the order in which retrieved blocks are transmitted to the host. For example, if host command 1 was received before host command 2, and if the controller 250 has retrieved all portions of block 2 before retrieving all portions of block 1, then the controller 250 can transmit portions of block 2 to the host first and then transmit portions of block 1, thereby altering the order in which the retrieved blocks are transmitted to the host.

Further, if the controller 250 has retrieved less than all portions of block 1 and all portions of block 2, then the controller 250 can delay a transmission of the portions of block 2 until all the portions of block 1 have been retrieved.

Figure 5:
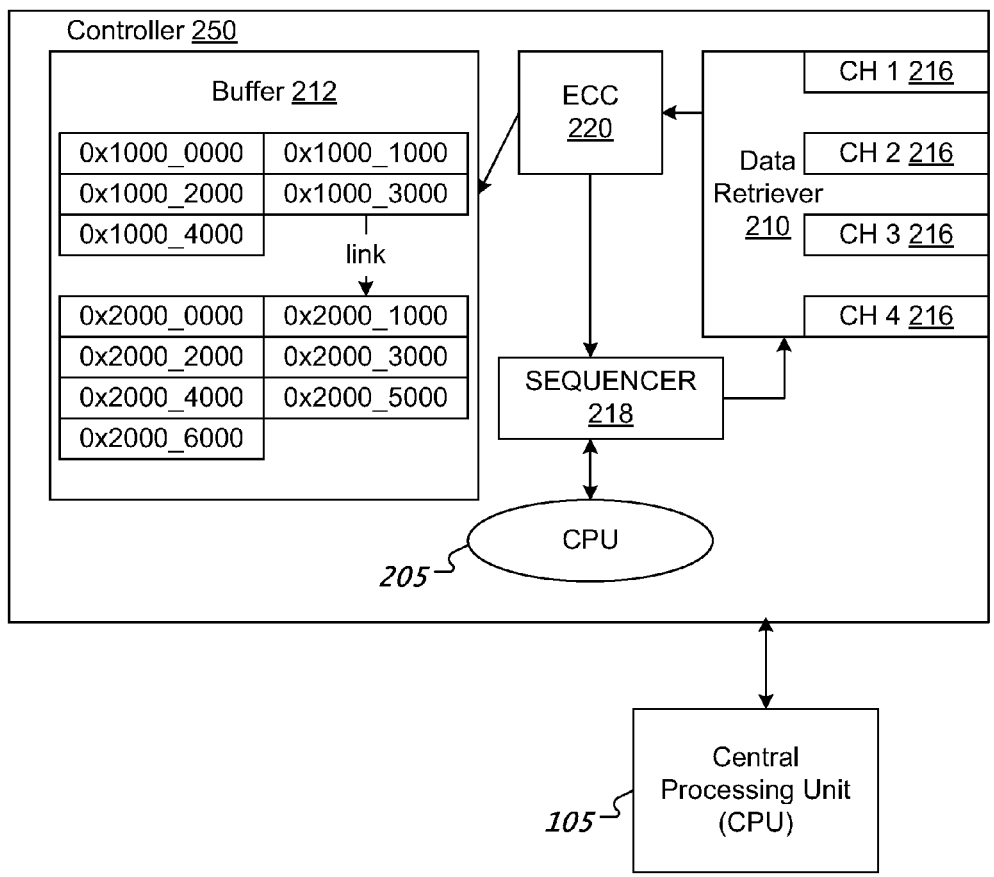
FIG. 5 shows an example of a buffer in a solid state controller including areas assigned for commands identifying blocks of data.

FIG. 5 shows an example of a buffer 212 in a solid state controller 250 including areas assigned for commands identifying blocks of data. In some implementations, for each block of data, the buffer 212 stores the buffer addresses for the portions of the block of data in a corresponding list. Lists that store the buffer addresses of blocks of data can be linked. Each entry in the list is a buffer space for storing a portion of a block of data. Each entry is further labeled with the corresponding buffer address. As the buffer 212 receives block_portions retrieved by the data retriever 210 and checked by the error checking and correction unit 220, the buffer 212 populates the linked lists by storing each block_portion in a corresponding buffer space identified based on the address of the block_portion.

Figure 6:
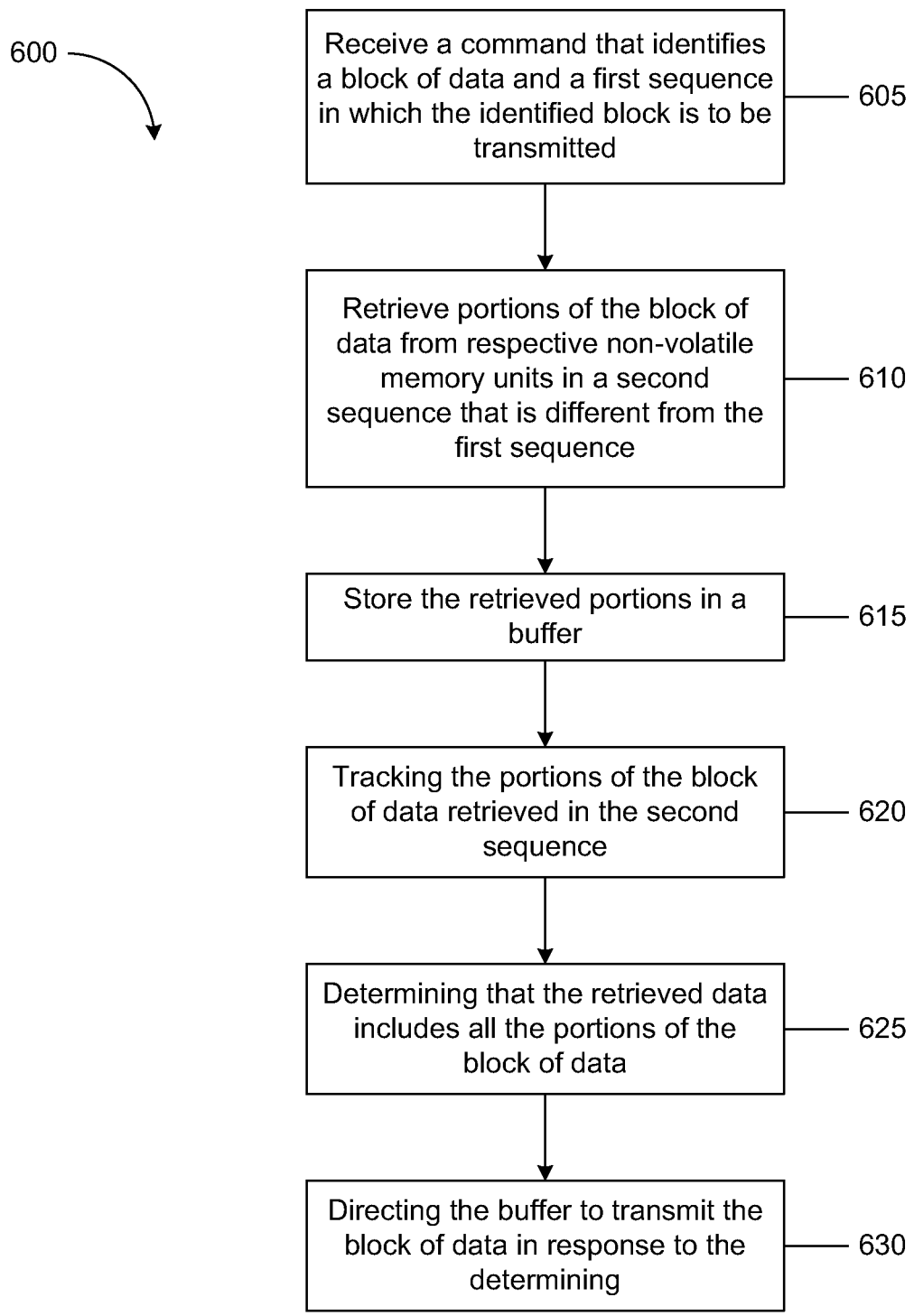
FIG. 6 shows an example of a process of retrieving data from non-volatile memory units responsive to commands from a host.

FIG. 6 shows an example of a process 600 of retrieving data from non-volatile memory units responsive to commands from a host. At 605, a command that identifies a block of data is received. The command also identifies a first sequence in which portions of blocks of data included in the identified block are to be transmitted. At 610, portions of the block of data are retrieved from respective non-volatile memory units in a second sequence that is different from the first sequence. At 615, the retrieved portions are stored in a buffer. At 620, the portions of the block of data retrieved in the second sequence are tracked. At 625, it is determined that the retrieved data includes all the portions of the block of data. At 630, the buffer is directed to transmit the block of data in response to the determining.

The process 600 can be implemented using processing circuitry, including hardware, firmware, or a combination of them. In some implementations, an additional command identifying an additional block of data can be received from the same host or from a different host. In response, portions corresponding to the block of data and the additional block of data can be retrieved. Further, the retrieved portions can be interleaved and transmitted to the buffer. Specifically, the retrieved portions can be interleaved such that portions of the additional block of data can be transmitted together with portions of the block of data.

A few embodiments have been described in detail above, and various modifications are possible. In some implementations, when large blocks of data are not distributed across multiple channels evenly, but are rather concentrated in a single channel, the controller 250 can execute multiple commands in parallel, thereby minimizing the execution time for a given group of large blocks of data. Table 4 shows four channels each operatively coupled to corresponding sectors of non-volatile memory units to access three large blocks of data—block 1 including portions 102-105, block 2 including portions 207-209, and block 4 including portions 404-407.

TABLE 4

Four channels 216 to access three large blocks of data

| CH 0 | CH 1 | CH 2 | CH 3 |
|---|---|---|---|
|  | 104 | 209 |  |
| 404 | 105 | 406 | 207 |
| 407 | 103 |  | 206 |
|  | 102 | 405 | 208 |
|  | . . . |  |  |

By servicing commands that have identified block 2 and block 4 in parallel with the command that has identified block 1, the bandwidth available in the channels 216 can be used and the read performance for the group of blocks of data can be maximized. Although the data retriever 210 reads the blocks in four passes/operations, three commands have been serviced in that duration.

To do so, a portion of a block of data can be sent to an appropriate location, for example, sector in the buffer 212. Typically, portions read in one operation are sent to the same logical segment in the buffer, which is a physical area of the buffer 212 that has been reserved to store portions of blocks of data. The logical segments can be contiguous address spaces or can be scattered physically, and linked and managed by the controller 250.

Figure 7:
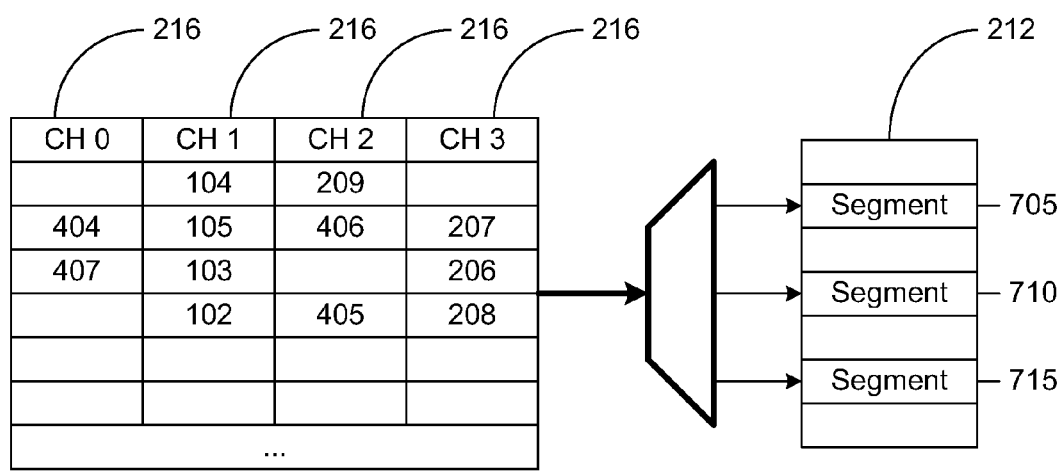
FIG. 7 shows an example of a dataflow from channels to the buffer.

FIG. 7 shows an example of a dataflow from channels 216 to the buffer 212. A data retrieval operation, that the data retriever 210 performs, can have multiple destination segments 705, 710, 715, in the buffer 212. Each destination segment can correspond to a command to be serviced, such command identifying a block of data. The CPU 205 can control the destination location. For example, CPU 205 can control the destination segment with the buffer scatter list. As each pass is executed, the CPU 205 can build up the buffer scatter list to distribute the portion of the block of data to the correct destination segment, and further to an appropriate offset within each segment.

The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

While this disclosure contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Other embodiments fall within the scope of the following claims:

The invention claimed is:

1. A device comprising:
   a buffer configured to hold a block of data corresponding to a command, where the command identifies the block of data and a first sequence in which portions of the identified block of data is to be transmitted to a host issuing the command, where the portions of the block of data are stored in respective non-volatile memory units;
   a data retriever configured to retrieve, in response to the command, the portions of the block of data from the respective non-volatile memory units in a second sequence that is different from the first sequence, the second sequence associated with retrieving the portions of the block of data non-successively;
   an error checking and correction unit operatively coupled to the data retriever, the error checking and correction unit configured to:
      receive the portions of the block of data from the data retriever according to the second sequence,
      as the portions of the block of data are being received from the data retriever according to the second sequence, check each of the portions of the block of data to determine that the portion of the block of data is error-free, and
      transmit the checked portions of the block of data to the buffer according to the second sequence; and
   a sequencer operatively coupled to the error checking and correction unit, the sequencer configured to:
      receive the first sequence,
      track the portions of the block of data retrieved in the second sequence, and
      provide an indication that the error checking and correction unit has transmitted all of the portions included in the block of data to the buffer,
   where the error checking and correction unit is configured to transmit a signal to the sequencer that indicates that a portion of the block of data is error-free,
   where the sequencer tracks the block of data retrieved in the second sequence by determining that, for each portion of the block of data, the error checking and correction unit transmits an identifier of the portion of the block of data and a signal indicating that the portion is error free, and
   where the buffer receives the checked portions of the block of data according to the second sequence, stores each of the checked portions of the block of data in a buffer space identified based on the first sequence, and transmits the block of data to the host according to the first sequence in response to the indication that the error checking and correction unit has transmitted all of the portions included in the block of data to the buffer.

2. The device of claim 1, where the buffer is configured to hold multiple blocks of data corresponding to respective commands, and where the data retriever is configured to retrieve different portions from different ones of the multiple blocks of data in parallel.

3. The device of claim 2, where the data retriever is configured to interleave portions of a block of data corresponding to a first command with portions of a block of data corresponding to a second command.

4. The device of claim 1, where each non-volatile memory unit includes multiple sectors, the portions of the block of data are stored across the sectors of the non-volatile memory units, and where the data retriever is configured to retrieve the portions of the block of data from the sectors in the second sequence.

5. A method comprising:
   receiving a command for a block of data, where the command identifies the block of data and a first sequence in which portions of the identified block of data is to be transmitted to a host issuing the command, and where the portions of the block of data are stored in respective non-volatile memory units;

retrieving, by processing circuitry, the portions of the block of data from the respective non-volatile memory units in a second sequence that is different from the first sequence, the second sequence associated with retrieving the portions of the block of data non-successively;

as the portions of the block of data are being received in the second sequence, checking each of the portions of the block of data to determine that the portion of the block of data is error-free;

transmitting a signal that indicates that the portion of the block of data is error-free;

storing each of the checked portions of the block of data in a buffer space of a buffer, the buffer space identified based on the first sequence;

determining that the stored data includes all the portions of the block of data, where the determining comprises tracking the block of data retrieved in the second sequence by determining that, for each portion of the block of data, an identifier of the portion of the block of data and a signal indicating that the portion is error-free are transmitted; and directing the buffer to transmit the block of data to the host according to the first sequence in response to the determining.

6. The method of claim 5, further comprising tracking the portions of the block of data retrieved in the second sequence.

7. The method of claim 5, further comprising:
receiving an additional command to transmit additional blocks of data; and
retrieving the block of data corresponding to the command and the additional block of data corresponding to the additional command, in parallel.

8. The method of claim 7, further comprising interleaving portions of the block of data with portions of the additional block of data, where the interleaved portions are stored in the buffer.

9. The method of claim 5, where each non-volatile memory unit includes multiple sectors, the portions of the block of data are stored across the sectors of the non-volatile memory units, and where retrieving the portions of the block of data comprises retrieving the portions of the block of data from the sectors in the second sequence.

10. The method of claim 9, where in the second sequence, retrieving the portions of the block of data comprises retrieving the portions of the block of data from the respective non-volatile memory units on a per-sector basis without skipping any channel associated with a sector.

11. The method of claim 9, where:
the multiple sectors include a first sector and a second sector; and
retrieving the portions of the block of data comprises retrieving, in the second sequence, a first portion of the portions of the block of data from the first sector before retrieving a second portion of the portions of the block of data from the second sector without skipping any channel in retrieving the first portion or the second portion.

12. A system comprising:
a plurality of non-volatile memory units configured to store portions of a plurality of blocks of data;
a host configured to transmit commands to receive two or more blocks of data of the plurality of blocks of data stored in one or more of the plurality of non-volatile memory units;
a controller configured to transmit data between the non-volatile memory units and the host, the controller configured to:
receive the commands from the host, each of the commands identifying a block of data of the two or more blocks of data and a first corresponding sequence in which portions of the block of data is to be transmitted to the host, and
retrieve, in parallel, the two or more blocks of data, where the portions of each respective block of data are retrieved in a second sequence that is different from the first sequence identified by the corresponding command, the second sequence associated with retrieving the portions of the corresponding block of data non-successively; and
an error checking and correction unit operatively coupled to the controller, the error checking and correction unit configured to:
receive the portions of each block of data from the controller according to the corresponding second sequence,
as the portions of each block of data are being received from the controller according to the corresponding second sequence, check each of the portions of each block of data to determine that the portion is error-free,
transmit a signal to the controller, the signal indicating that the portion of the block of data is error-free, and
store each of the checked portions of each block of data in a buffer space identified based on the corresponding first sequence,
wherein the controller is configured to:
track the block of data retrieved in the second sequence by determining that, for each portion of the block of data, an identifier of the portion of the block of data and a signal indicating that the portion is error-free are transmitted,
determine that, for each of the commands, the stored portions of the corresponding block of data include all of the data in the block, and
transmit, for each of the commands, the stored portions of the corresponding block of data to the host based on the corresponding first sequence in response to the determining.

13. The system of claim 12, wherein the controller is further configured to interleave portions of a first block of data retrieved in response to receiving a first command with portions of a second block of data retrieved in response to a second command, where the interleaved portions are stored in the non-volatile memory units.

14. The system of claim 12, where each non-volatile memory unit includes multiple sectors, the portions of the block of data stored across the sectors of the non-volatile memory units, and where the controller is configured to retrieve the portions of the block of data from the sectors in the second sequence.

15. The system of claim 14, where in the second sequence, the controller is configured to retrieve the portions of the block of data from the respective non-volatile memory units on a per-sector basis without skipping any channel associated with a sector.

16. The system of claim 14, where:
the multiple sectors include a first sector and a second sector; and
the controller is configured to retrieve, in the second sequence, a first portion of the portions of the block of data from the first sector before retrieving a second portion of the portions of the block of data from the second sector without skipping any channel in retrieving the first portion or the second portion.

17. The device of claim 4, where in the second sequence, the data retriever is configured to retrieve the portions of the block of data from the respective non-volatile memory units on a per-sector basis without skipping any channel associated with a sector.

18. The device of claim 4, where:
the multiple sectors include a first sector and a second sector; and
the data retriever is configured to retrieve, in the second sequence, a first portion of the portions of the block of data from the first sector before retrieving a second portion of the portions of the block of data from the second sector without skipping any channel in retrieving the first portion or the second portion.

* * * * *